(12) United States Patent
Drobnik (10) Patent No.: US 6,430,069 B1
(45) Date of Patent: *Aug. 6, 2002

(54) CONTACTLESS CONNECTORS FOR USE IN A HIGH FREQUENCY ALTERNATING CURRENT POWER DISTRIBUTION SYSTEM

(75) Inventor: Josef C. Drobnik, Hillsboro, OR (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/312,257

(22) Filed: May 14, 1999

(51) Int. Cl.$^7$ ................................................ H02M 7/00
(52) U.S. Cl. ......................... 363/68; 320/108; 336/200
(58) Field of Search ............................... 363/34, 35, 37, 363/60, 68; 361/90; 323/207, 262, 263, 902, 259

(56) References Cited

U.S. PATENT DOCUMENTS

| | | | | |
|---|---|---|---|---|
| 4,654,573 A | * | 3/1987 | Rough et al. ................. | 363/18 |
| 4,792,910 A | * | 12/1988 | Lange ......................... | 364/519 |
| 4,837,556 A | * | 6/1989 | Matsushita et al. .......... | 340/310 |
| 4,951,171 A | * | 8/1990 | Tran et al. ..................... | 361/90 |
| 5,157,319 A | * | 10/1992 | Klomtz et al. ............... | 320/108 |
| 5,264,776 A | * | 11/1993 | Hulsey ........................ | 320/108 |
| 5,341,280 A | * | 8/1994 | Divan et al. .................. | 363/37 |
| 5,495,241 A | | 2/1996 | Donig et al. | |
| 5,500,791 A | * | 3/1996 | Kheraluwala et al. ........ | 363/17 |
| 5,747,894 A | * | 5/1998 | Hirai et al. .................. | 307/104 |
| 5,808,881 A | * | 9/1998 | Lee .............................. | 363/37 |
| 5,889,384 A | * | 3/1999 | Hayes et al. ................. | 320/108 |

FOREIGN PATENT DOCUMENTS

| | | |
|---|---|---|
| DE | 196 21 003 A1 | 11/1997 |
| GB | 2 262 634 A | 6/1993 |

* cited by examiner

Primary Examiner—Rajnikant B. Patel
(74) Attorney, Agent, or Firm—Blakely, Sokoloff, Taylor & Zafman LLP (57) ABSTRACT

A high frequency alternating current (AC) power distribution system includes a transmission medium. A system power supply is coupled to the transmission medium. A high frequency AC voltage regulator module (VRM) is coupled to the transmission medium via a contactless connector.

14 Claims, 9 Drawing Sheets

CONTACTLESS CONNECTORS FOR USE IN A HIGH FREQUENCY ALTERNATING CURRENT POWER DISTRIBUTION SYSTEM

FIELD OF THE INVENTION

The present invention relates to the field of power distribution in computer systems. More specifically, the present invention relates to a method and apparatus for connecting components in a high frequency alternating current (AC) power distribution system.

BACKGROUND OF THE INVENTION

Power distribution systems serve the purpose of supplying power to components in a computer systems. Most personal computers can be plugged into a standard electrical outlet. The power distribution system supply pulls the required amount of power and converts the power from an alternating current (AC) domain to a direct current (DC) domain. It also regulates the voltage and current to eliminate spikes and surges common in most electrical systems. Power distribution systems typically include a system power supply, voltage regulator modules, and connectors that couple the system power supply to the voltage regulator modules. The connectors typically include a male component having a plurality of exposed conductive pins and a female component having a plurality of conductive receptacles. The conductive pins and the conductive receptacles must be in contact in order for power to transmitted between the system power supply and the voltage regulator modules.

The connectors used in the past had several drawbacks. Physical damage to the conductive pins resulted in failed connections. This affected the reliability of the power distribution system in which they were used. Also, manufacture specifications typically limited the amount of voltage that could be transferred over the connectors. Systems requiring an amount of voltage higher than that allowed by the specifications had to be redesigned.

SUMMARY

A high frequency alternating current (AC) power distribution system is disclosed. The high frequency AC power distribution system includes a transmission medium. A system power supply is coupled to the transmission medium. A high frequency AC voltage regulator module (VRM) is coupled to the transmission medium via a contactless connector.

BRIEF DESCRIPTION OF THE DRAWINGS

The present invention is illustrated by way of example and not by way of limitation in the figures of the accompanying drawings, in which the like references indicate similar elements in and in which.

DETAILED DESCRIPTION

Figure 1:
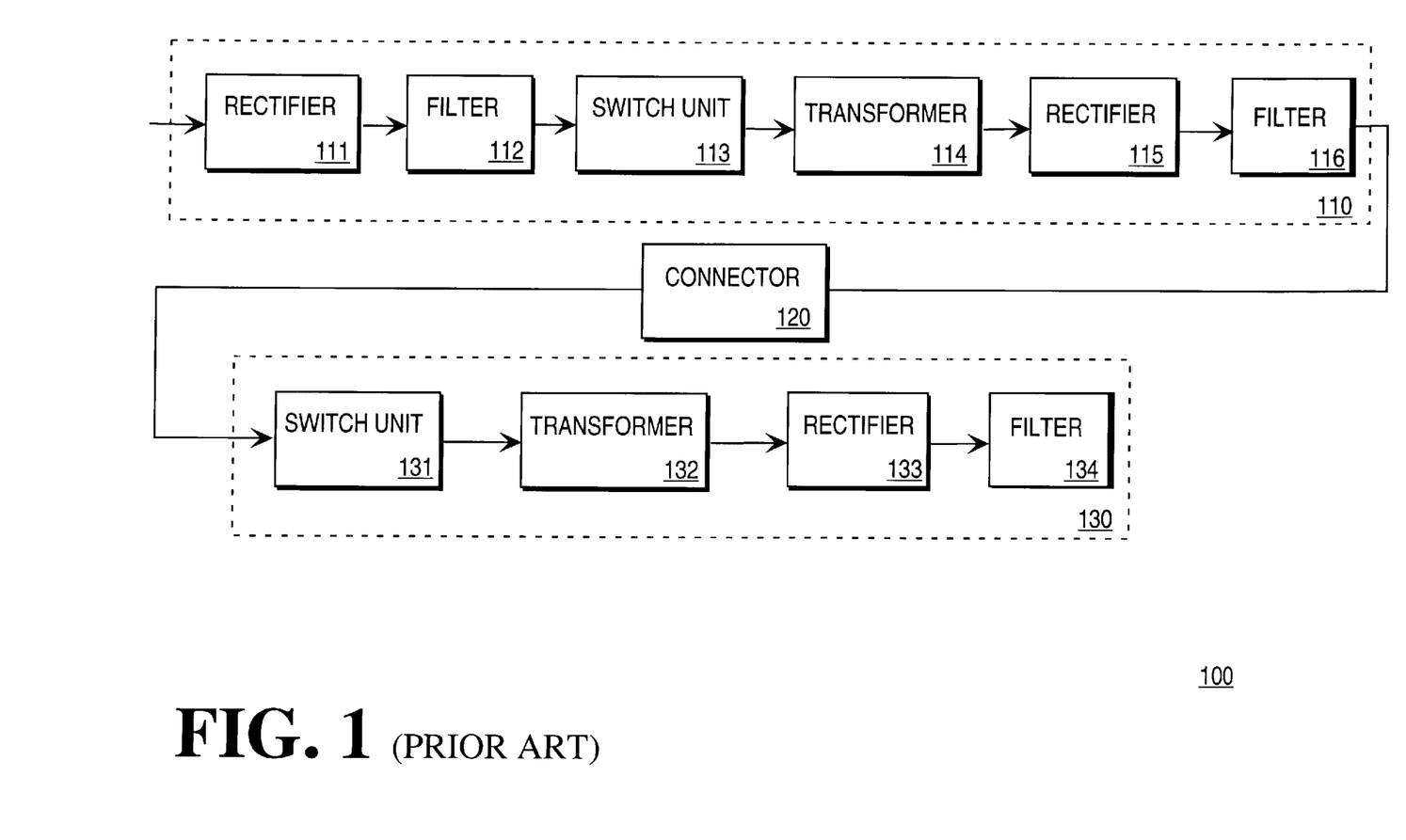
FIG. 1 is a block diagram of a conventional direct current power distribution system.

FIG. 1 illustrates a conventional direct current (DC) power distribution system 100 known in the prior art. The DC power distribution system 100 includes a main power supply 110, a connector 120, and a voltage regulator module 130. The main power supply 110 receives power from a power source (not shown) and processes the power before transmitting it to a voltage regulator module 130 via a connector 120. The main power supply 110 includes a first rectifier unit 111 that receives power in a low frequency alternating current (AC) domain from the power source. The first rectifier unit 111 converts the AC power to DC power. A first filter unit 112 is coupled to the first rectifier unit 111. The first filter unit 112 reduces ripple in the DC power. A first switch unit 113 is coupled to the first filter unit 111. The first switch unit 113 receives the DC power from the first filter unit 112 and converts the DC power to high frequency AC power. A first transformer 114 is coupled to the first switch unit 113. The first transformer 114 receives the high frequency AC power from the first switch unit 113 and steps the high frequency AC power down to a lower voltage level. A second rectifier unit 115 is coupled to the first transformer 114. The second rectifier unit 115 receives the high frequency AC power from the first transformer and converts the high frequency AC power to DC power. A second filter unit 116 is coupled to the second rectifier unit 115. The second filter unit 116 receives the DC power from the second rectifier unit 115 and filters away noise from the DC power and transmits the DC power to the connector 120.

The voltage regulator module 130 receives the DC power from the connector 120 and further regulates the power before transmitting the power to a component on a computer system (not shown). The voltage regulator module 130 includes a second switch unit 131. The second switch unit 131 receives the DC power from the main power supply 110 and converts the DC power to AC power. A second transformer 132 is coupled to the second switch 131. The second transformer receives the AC power from the second switch and steps the AC power down to a lower level. A third rectifier unit 133 is coupled to the second transformer. The third rectifier receives the AC power and converts it to DC power. A second filter unit 134 is coupled to the third rectifier unit 133. The third filter unit 134 receives the DC power from the third rectifier unit 133 and filters away ripple from the DC power. The DC power is transmitted from the power regulator module 130 to a component requiring power.

When multiple voltage regulator modules are coupled to the main power supply 110, the transformer 114 is required to have multiple windings. Additional rectifiers and filters in the main power supply 110 would connect the power from the additional windings of the transformer to additional connectors that transmits the power to the additional voltage regulator modules.

The connector 120 includes a male component (not shown) having a plurality of exposed conductive pins and a female component (not shown) having a plurality of conductive receptacles. Typically, the main power supply 110 would be coupled to one of the male and female components and the voltage regulator module 130 would be coupled to the other component. In order to electrically connect the main power supply 110 with the voltage regulator module 130, the conductive pins of the male component and the conductive receptacles of the female component must be in contact.

Figure 2:
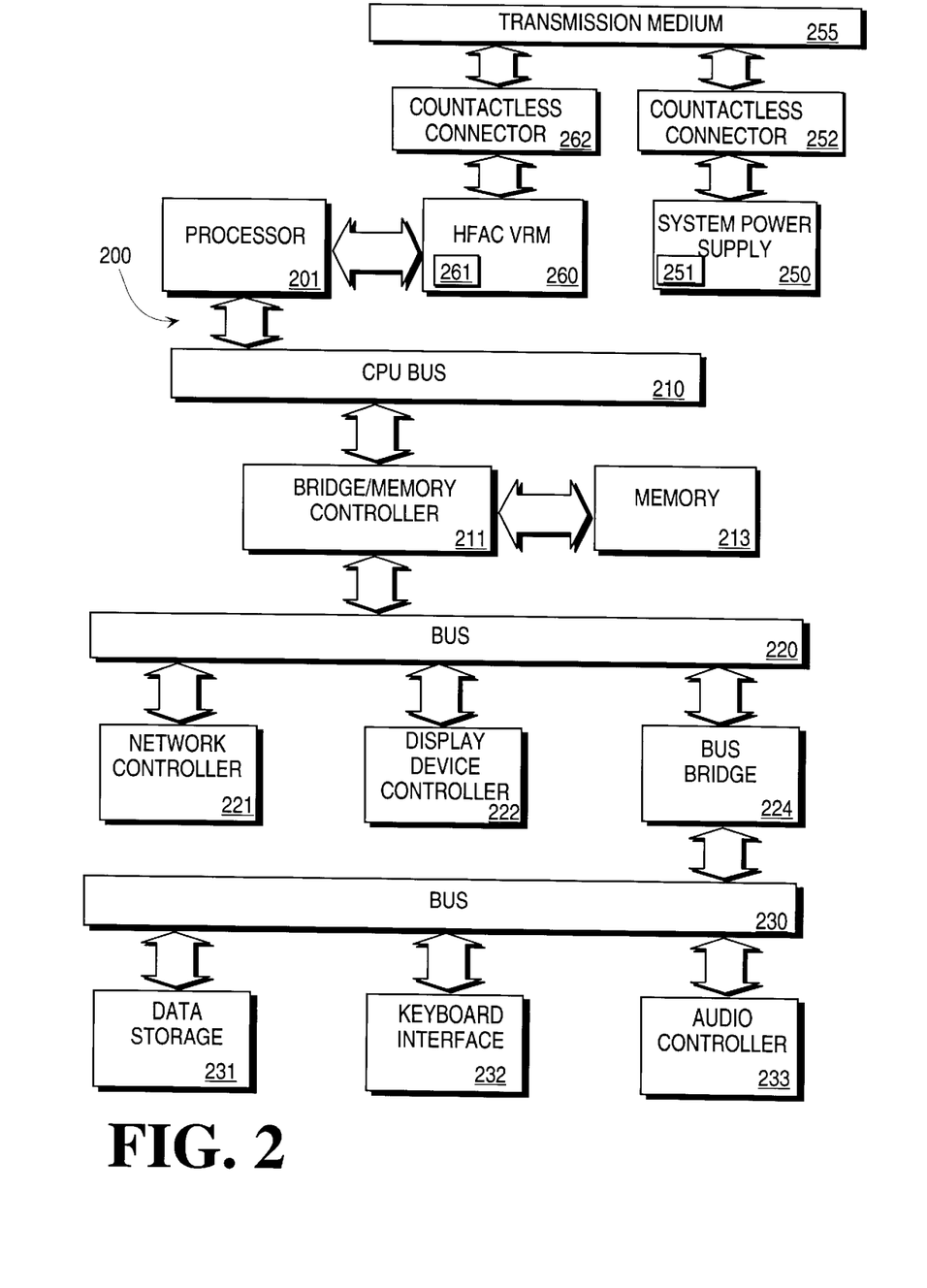
FIG. 2 is a block diagram of a computer system implementing an embodiment of the present invention.

FIG. 2 illustrates a computer system 200 upon which an embodiment of the present invention can be implemented. The computer system 200 includes a processor 201 that processes data signals. The processor 201 may be a complex instruction set computer (CISC) microprocessor, a reduced instruction set computing (RISC) microprocessor, a very long instruction word (VLIW) microprocessor, a processor implementing a combination of instruction sets, or other processor device. FIG. 2 shows an example of the present invention implemented on a single processor computer system 200. However, it is understood that the present invention may be implemented in a computer system having multiple processors. The processor 201 is coupled to a CPU bus 210 that transmits data signals between processor 201 and other components in the computer system 200.

The computer system 200 includes a memory 213. The memory 213 may be a dynamic random access memory (DRAM) device, a synchronous direct random access memory (SDRAM) device, or other memory device. The memory 213 may store instructions and code represented by data signals that may be executed by the processor 201.

A bridge/memory controller 211 is coupled to the CPU bus 210 and the memory 213. The bridge/memory controller 211 directs data signals between the processor 201, the memory 213, and other components in the computer system 200 and bridges the data signals between the CPU bus 210, the memory 213, and a first I/O bus 220.

The first I/O bus 220 may be a single bus or a combination of multiple buses. As an example, the first I/O bus 220 may comprise a Peripheral Component Interconnect (PCI) bus, a Personal Computer Memory Card International Association (PCMCIA) bus, a NuBus, or other buses. The first I/O bus 220 provides communication links between components in the computer system 200. A network controller 221 is coupled to the first I/O bus 220. The network controller 221 links the computer system 200 to a network of computers (not shown in FIG. 2) and supports communication among the machines. A display device controller 222 is coupled to the first I/O bus 220. The display device controller 222 allows coupling of a display device (not shown) to the computer system 200 and acts as an interface between the display device and the computer system 200. The display device controller 222 may be a monochrome display adapter (MDA) card, a color graphics adapter (CGA) card, an enhanced graphics adapter (EGA) card, an extended graphics array (XGA) card or other display device controller. The display device may be a television set, a computer monitor, a flat panel display or other display device. The display device receives data signals from the processor 201 through the display device controller 222 and displays the information and data signals to the user of the computer system 200.

A second I/O bus 230 may be a single bus or a combination of multiple buses. As an example, the second I/O bus 230 may comprise a PCI bus, a PCMCIA bus, a NuBus, an Industry Standard Architecture (ISA) bus, or other buses. The second I/O bus 230 provides communication links between components in the computer system 200. A data storage device 231 is coupled to the second I/O bus 230. The data storage device 231 may be a hard disk drive, a floppy disk drive, a CD-ROM device, a flash memory device or other mass storage device. A keyboard interface 232 is coupled to the second I/O bus 230. The keyboard interface 232 may be a keyboard controller or other keyboard interface. The keyboard interface 232 may be a dedicated device or can reside in another device such as a bus controller or other controller. The keyboard interface 232 allows coupling of a keyboard (not shown) to the computer system 200 and transmits data signals from a keyboard to the computer system 200. An audio controller 233 is coupled to the second I/O bus 230. The audio controller 233 operates to coordinate the recording and playing of sounds.

A bus bridge 224 couples the first I/O bus 220 to the second I/O bus 230. The bus bridge 224 operates to buffer and bridge data signals between the first I/O bus 220 and the second I/O bus 230.

The computer system 200 includes a system power supply 250. The system power supply 250 receives power from a power source such as a wall socket (not shown) or other power source. The system power supply 250 includes an inverter unit 251 that processes the power received from the power source and transmits the power in a high frequency alternating current (AC) domain on a transmission medium 255. According to an embodiment of the present invention, the transmission medium 255 may be an AC bus. The AC bus 255 may be a bus designated for distributing AC power or may be a data bus with power transmitting capabilities. The computer system 200 includes a high frequency AC voltage regulator module 260. The high frequency AC voltage regulator module 260 is coupled to the AC bus 255. The high frequency AC voltage regulator module 260 receives power in the AC domain from the AC bus 255 and includes a post-regulator unit 261 that regulates the power to a voltage and current level appropriate for the processor 201. According to an embodiment of the present invention, the system power supply 250 is coupled to the AC bus 255 via a first contactless connector 252 and the high frequency AC voltage regulator module 260 is coupled to the AC bus 255 via a second contactless connector 262. It should be appreciated that the system power supply 250 may be coupled to the AC bus 255 through other media. The contactless connectors 261 and 262 allow coupling of the system power supply 250 and the high frequency AC voltage regulator module 260 to the AC bus 255 without requiring the mating of conductive components.

FIG. 2 illustrates the computer system having a single high frequency AC voltage regulator module 260 coupled to the AC bus 255. It should be appreciated that any number of high frequency AC voltage regulator modules may be coupled to the AC bus 255 to provide regulated power to the components in the computer system. According to an embodiment of the present invention, the memory 213, memory/bridge controller 211, network controller 221, display device controller 222, data storage device 231, keyboard interface 232, audio controller 233, and bus bridge 224 may each be coupled to a high frequency AC voltage regulator module (not shown) that receives power from the AC bus 255.

Figure 3:
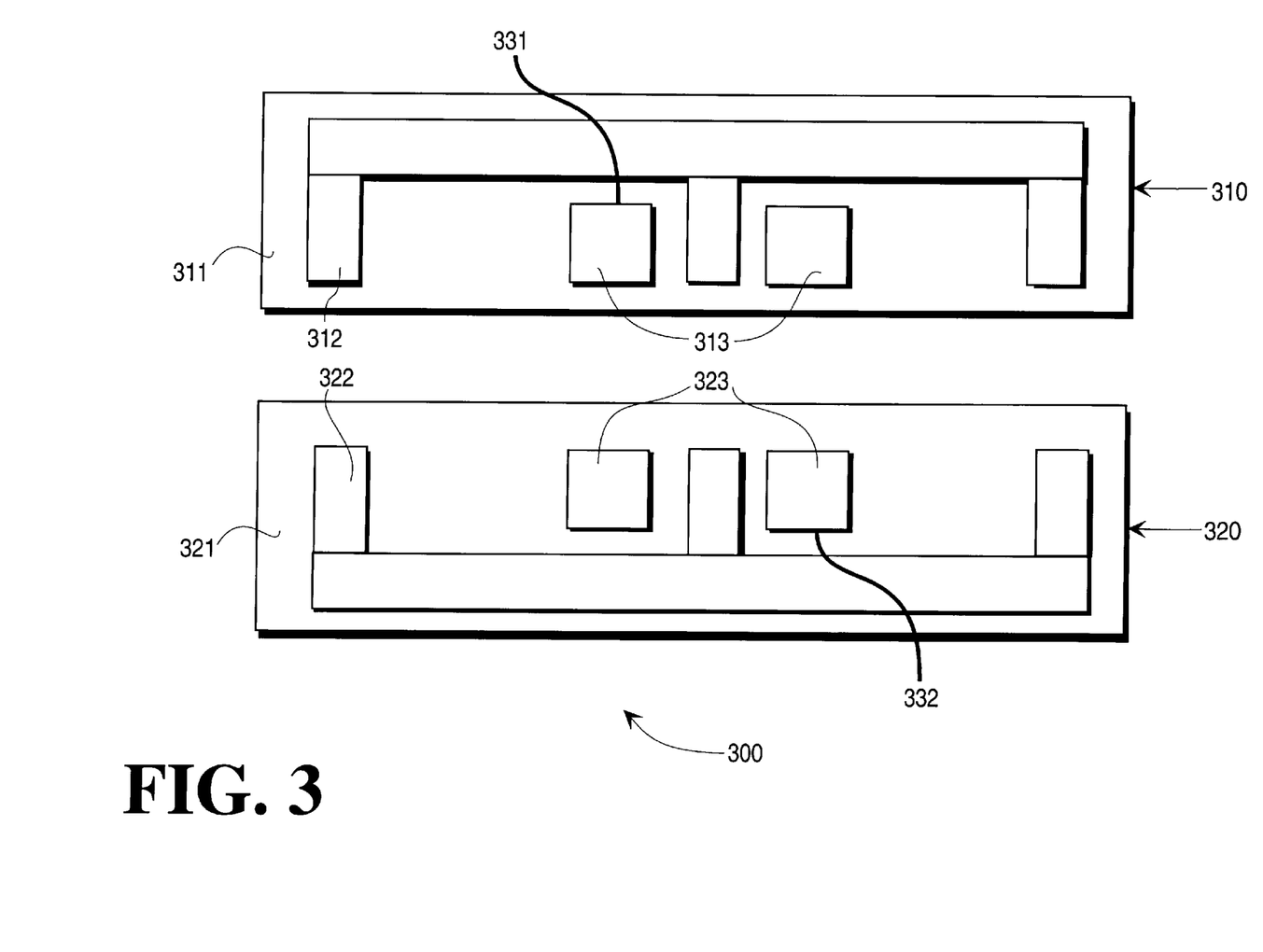
FIG. 3 illustrates a cross-sectional view of a connectorless connector according to an embodiment of the present invention.

FIG. 3 illustrates a cross-sectional view of a contactless connector 300 according to an embodiment of the present invention. The contactless connector 300 may be implemented as the contactless connector 252 or 262 illustrated in FIG. 2. The contactless connector 300 includes a primary core 310 and a secondary core 320. The primary core 310 includes a first housing 311 that encapsulates a first core 312 and a first winding of conductive material 313. Similarly, the secondary core 320 includes a second housing 321 that encapsulates a second core 322 and a second winding of conductive material 323. When the first housing 311 is placed in close proximity to the second housing 321, current and voltage distribution is achieved between the first winding of conductive material 313 and the second winding of the conductive material 323 without requiring contact of conductive components. The contactless connector 300 may also operate as a transformer to step voltage levels up or down by varying the windings of conductive material in the primary and secondary cores 310 and 320.

According to an embodiment of the present invention, where the contactless connector 300 is implemented as the contactless connector 252, the first winding of conductive material 313 at the primary core 310 may be coupled to cable 331 connected to the system power supply 250 (shown in FIG. 2) and the second winding of the conductive material 323 at the secondary core 320 may be coupled to a cable 332 connected to the AC bus 255 (shown in FIG. 2). According to an embodiment of the present invention where the contactless connector 300 is implemented as the contactless connector 262, the first winding of the conductive material 313 at the primary core 310 may be coupled to a cable 331 connected to the AC bus 255 and the second winding of the conductive material 323 at the secondary core 320 may be coupled to a cable 332 connected to the high frequency AC voltage regulator module 260 (shown in FIG. 2).

The contactless connector 300 utilizes the properties of electromagnetic coupling found in high frequency alternating current. Electro-magnetic coupling allows the contactless connector 300 to distribute voltage and current without requiring the physical contact of conductive components. The contactless connector 300 eliminates electrical conductive paths between circuits and potentially hazardous voltage areas that may be exposed. According to an embodiment of the present invention, the contactless connector 300 is a detachable transformer. The contactless connector 300 includes a primary core 310 having a primary winding of the transformer and a secondary core 320 having a secondary winding of the transformer. The first housing 310 and the second housing 320 of the contactless connector 300 may be fastened together to establish a connection.

Figure 4:
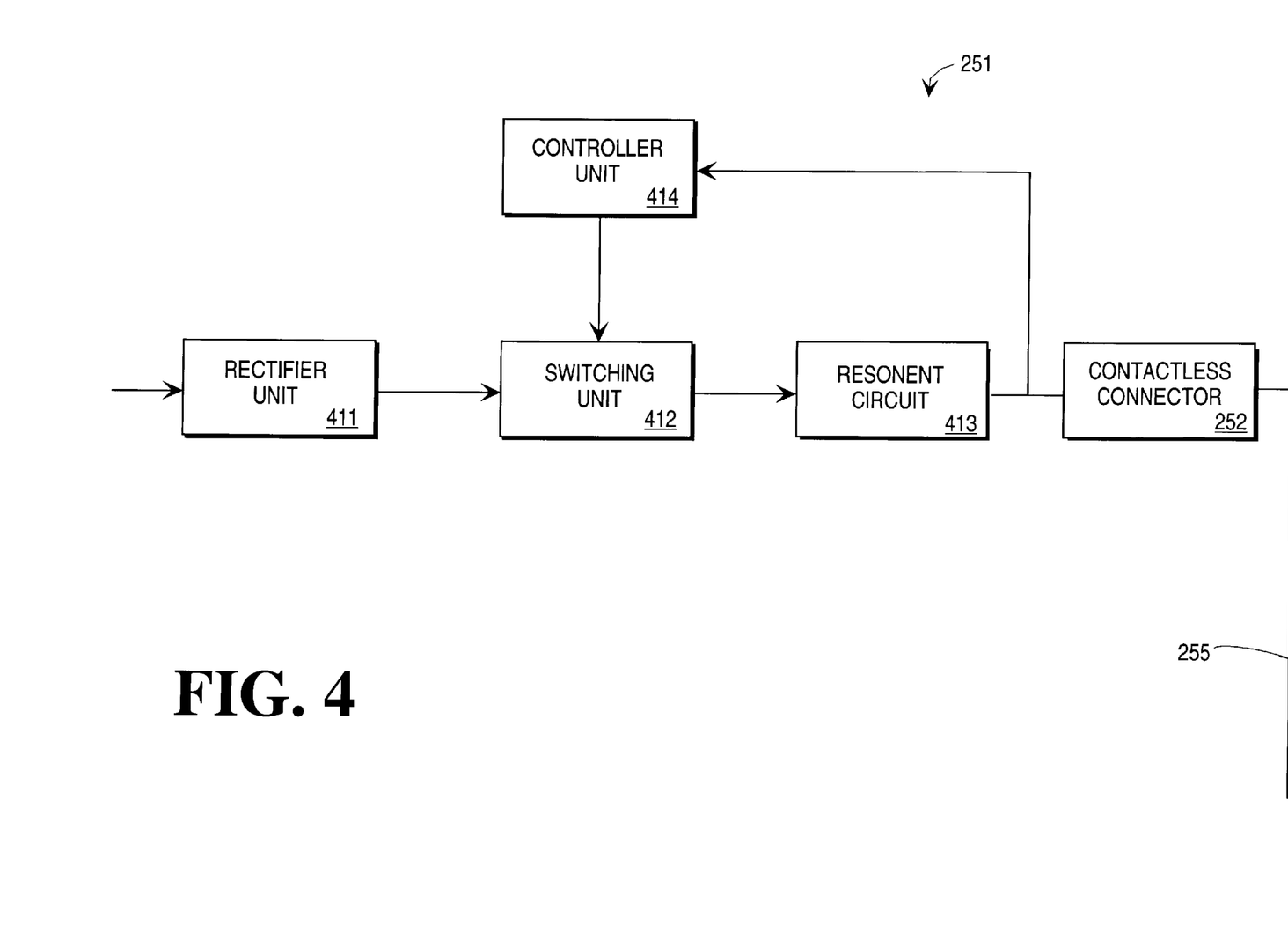
FIG. 4 is a block diagram of an inverter in a system power supply coupled to a connectorless connector according to an embodiment of the present invention.

FIG. 4 is a block diagram of an inverter 251 in a system power supply 250 (shown in FIG. 2) coupled to a contactless connector 252 according to an embodiment of the present invention. The inverter unit 251 includes a rectifier unit 411. The rectifier unit 411 receives AC power from a power source (not shown). The rectifier unit 411 converts the AC power to a DC domain. A switching unit 412 is coupled to the rectifier unit 411. The switching unit 412 receives the DC power from the rectifier unit 411 and converts the DC power to a high frequency AC domain. A resonant circuit 413 is coupled to the switching unit 412. The resonant circuit receives high frequency AC power from the switching unit and smooths the high frequency AC power before transmitting it onto the AC bus 255. According to an embodiment of the present invention, the resonant circuit 413 includes a capacitive and inductive elements. A controller unit 414 is coupled to the AC bus 255 and the switching unit 412. The controller unit 414 monitors the voltage and current levels at the output of the inverter 251 and adjusts the switching unit 412 such that the power transmitted onto the AC bus 255 via the resonant circuit 413 is at predetermined level.

The rectifier unit 411, switching unit 412, resonant circuit 413, and the controller unit 414 may be implemented using any known circuitry or technique. According to an embodiment of the present invention, the rectifier unit 411, switching unit 412, resonant circuit 413, and the controller unit 414 may all reside on a single semiconductor substrate, be discrete components, or a combination of both.

Figure 5:
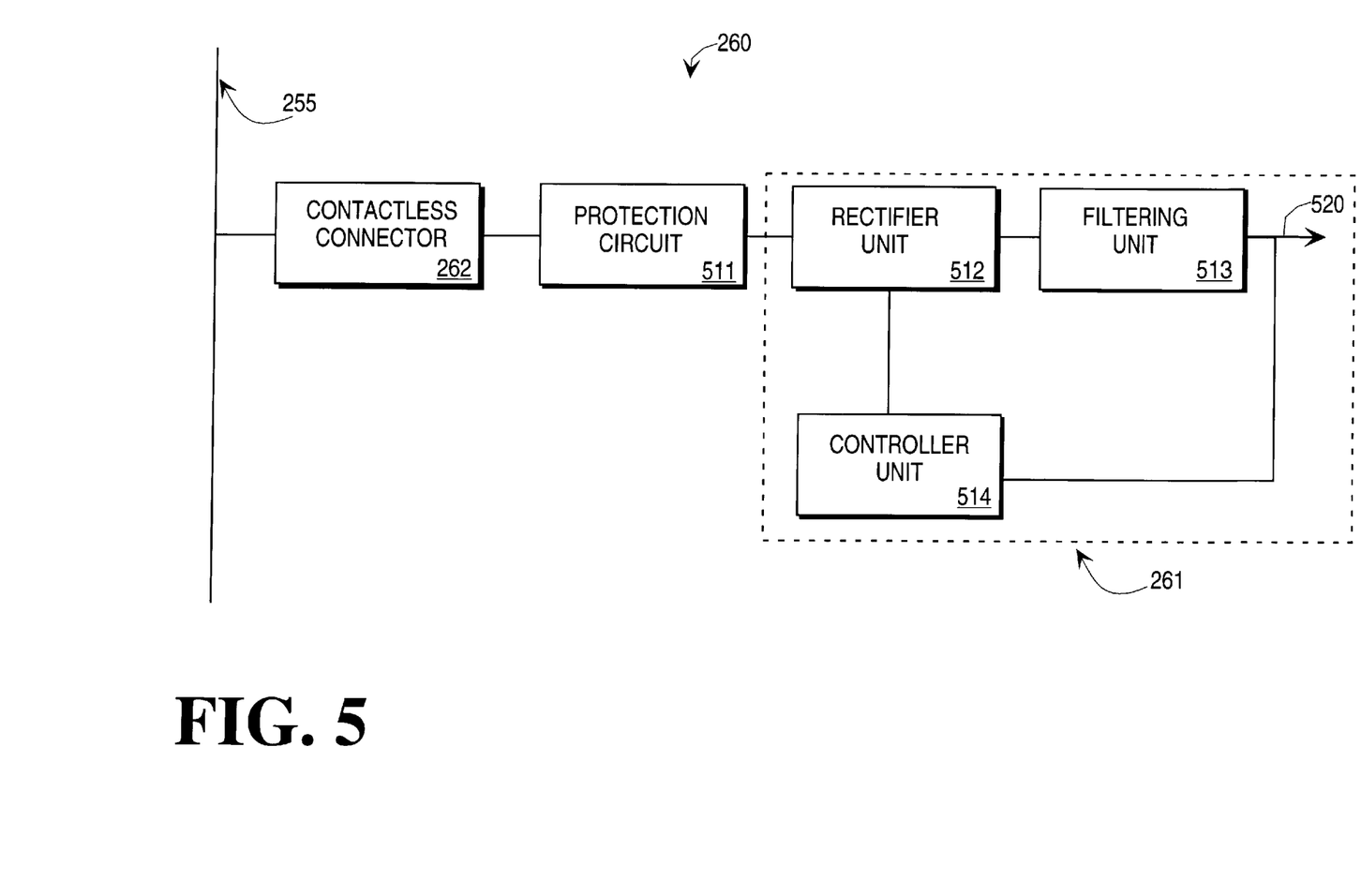
FIG. 5 is a block diagram of a connectorless connector coupled to a post-regulator unit in a high frequency alternating current voltage regulator modulate according to an embodiment of the present invention.

FIG. 5 is a block diagram of a contactless connector 262 coupled to a high frequency AC voltage regulator module 260 according to an embodiment of the present invention. The contactless connector 262 includes a transformer (not shown) that receives high frequency AC power from the AC bus 255. The transformer steps the high frequency AC power down to a lower level. The AC voltage regulator module 260 includes a protection circuit 511 and a post-regulator unit 261. The protection circuit 511 is coupled to the AC bus 255 via the contactless connector 262 and receives power in the high frequency AC domain from the AC bus 255. The protection circuit 511 regulates a level of current received from the AC bus 255 that is sent to the post-regulator unit 261. By regulating the level of current that is sent to the post-regulator unit 261, the protection circuit 511 prevents levels of current that might cause damage to the post-regulator unit 261 from being transmitted.

According to an embodiment of the present invention, the protection circuit 511 includes an inductor component and a capacitor component. The inductor component and the capacitor component of the protection circuit 511 and a resistive load generated by the post-regulator unit 261 forms an in-series resonant circuit. According to an embodiment of the present invention, the in-series resonant circuit may be configured to resonate at the switching frequency of the inverter unit 251 (shown in FIG. 2) by matching the value of the inductor and the capacitor components of the protection circuit 511 with the resistive load generated by the post-regulator unit 261. In an alternate embodiment of the present invention, the protection circuit 511 may reside in the contactless connector 262 or on the AC bus 255.

Figure 6:
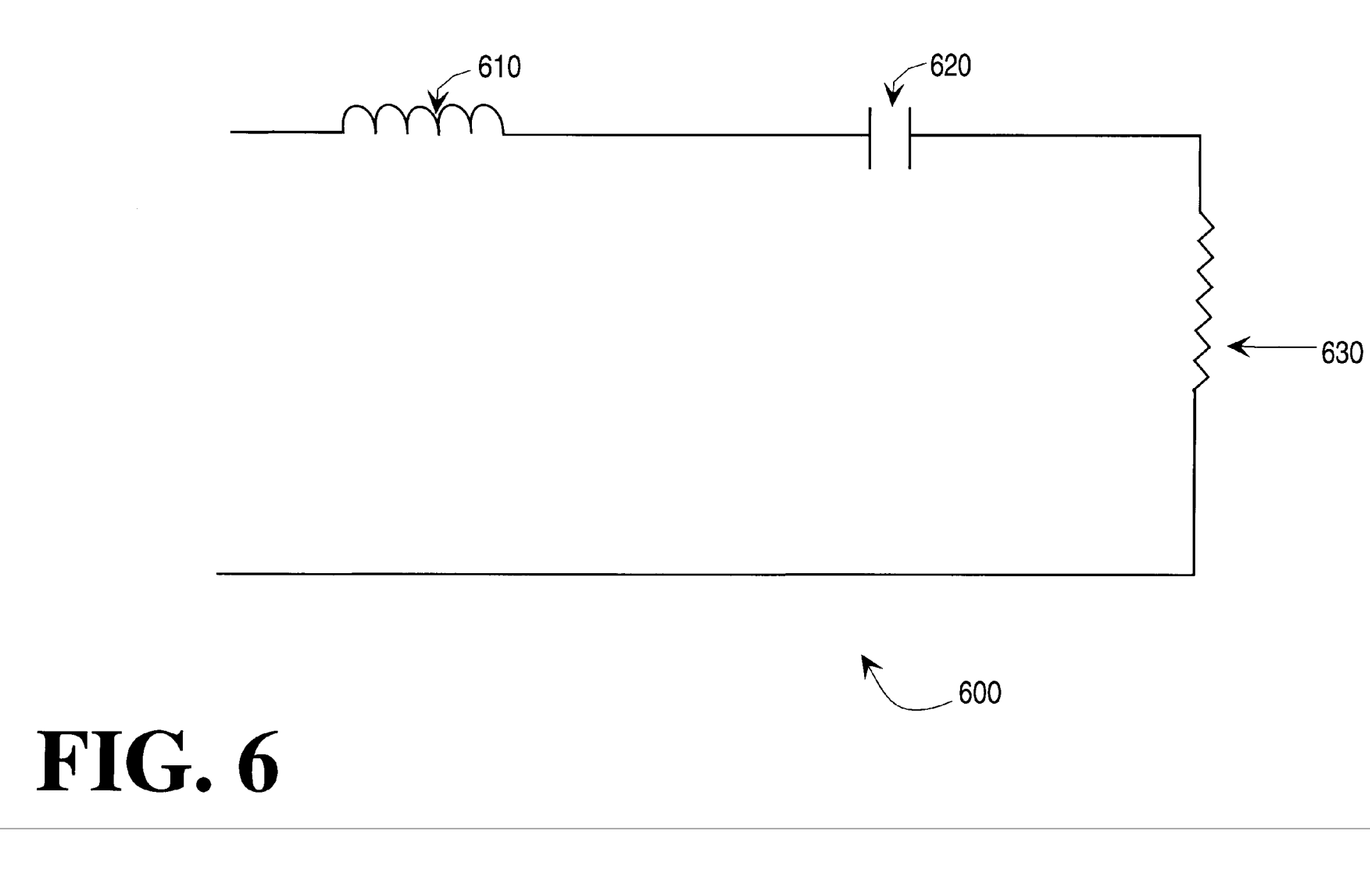
FIG. 6 is an equivalent circuit of a protection circuit and a post-regulator unit.

FIG. 6 illustrates an equivalent circuit 600 of the protection circuit 511 (shown in FIG. 5) and the post-regulator unit 261 (shown in FIG. 5). The inductor 610 and the capacitor 620 represent components in the protection circuit 511. The resistor 630 represents the resistive load of the post-regulator unit 261. When the high frequency AC voltage regulator module is supplied a nominal amount of current, the effective voltage drop across the components in the equivalent circuit 600 is virtually zero. The quality factor (Q) in this situation is within a predetermined limit. According to an embodiment of the present invention, Q has the predetermined limit of 2.2 to 2.8. When the current supplied to the high frequency AC voltage regulator module 260 (shown in FIG. 2) exceeds the nominal limit, the Q increases which results in an increase of the voltage across the inductor 610 and the capacitor 620. This causes the inductor 610 to saturate. The saturation effect reduces the value of its inductance, pushing the in-series resonant circuit out of resonance and reduces the voltage across the terminals of the protection circuit 261 which is represented by the resistor 630. Accordingly, this reduces the current through the protection circuit 261.

Referring back to FIG. 5, the post-regulator unit 261 is coupled to the protection circuit 511. The post-regulator unit 261 includes a rectifier 512. The rectifier unit 512 receives the high frequency AC power from the protection circuit 511 and converts the high frequency AC power into the DC domain. A filtering unit 513 is coupled to the rectifier unit 512. The filtering unit 513 receives the DC power from the rectifier unit 512 and filters away ripple from the DC power before transmitting the power to a component on the computer system (not shown) via line 520. A controller unit 514 is coupled to the line 520 and the rectifier unit 512. The controller unit 514 monitors the voltage and current levels on the line 520 and adjusts the rectifier unit 512 such that the power transmitted onto the line 520 via the filter 513 is at predetermined level. According to an embodiment of the present invention, the post regulator 261 may include only the rectifier unit 512 that converts the high frequency AC power from the AC bus 255 into the DC domain before transmitting it to the line 520.

The protection circuit 511, rectifier unit 512, filtering unit 513, and the controller unit 514 may be implemented using any known circuitry or technique. In an embodiment of the present invention, the protection circuit 511, rectifier unit 512, filtering unit 513, and the controller unit 514 may all reside on a single semiconductor substrate, be discrete components, or be a combination of both.

The system power supply 250 (shown in FIG. 2) and the high frequency AC voltage regulator module 260 (shown in FIG. 2) allow the distribution of power in a high frequency AC domain. Distribution of power in the high frequency AC domain improves the reliability of regulation of current to components in the computer system having high DI/IDT requirements. The system power supply 250 and the high frequency AC voltage regulator module 260 also eliminate the need for dual conversion as required by DC power distribution systems. Furthermore, the utilization of the AC bus 255 to distribute high frequency AC power eliminates the requirement of multiple winding transistors and additional rectifiers and filters.

Figure 7A:
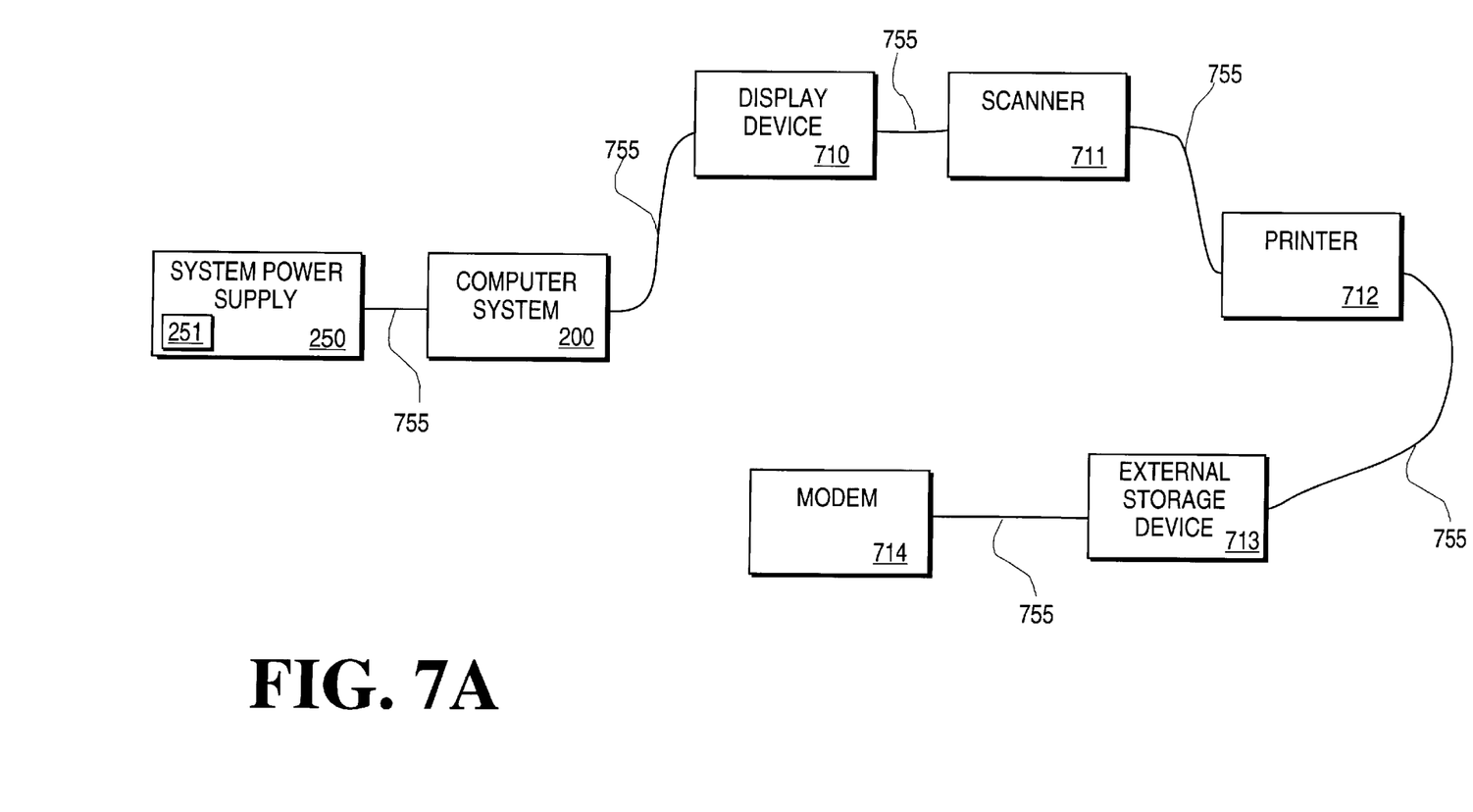
FIG. 7a is a block diagram illustrating devices external to the chassis of a computer system connected together in a daisy-chain topology and powered by the high frequency alternating current power distribution system according to an embodiment of the present invention.
Figure 7B:
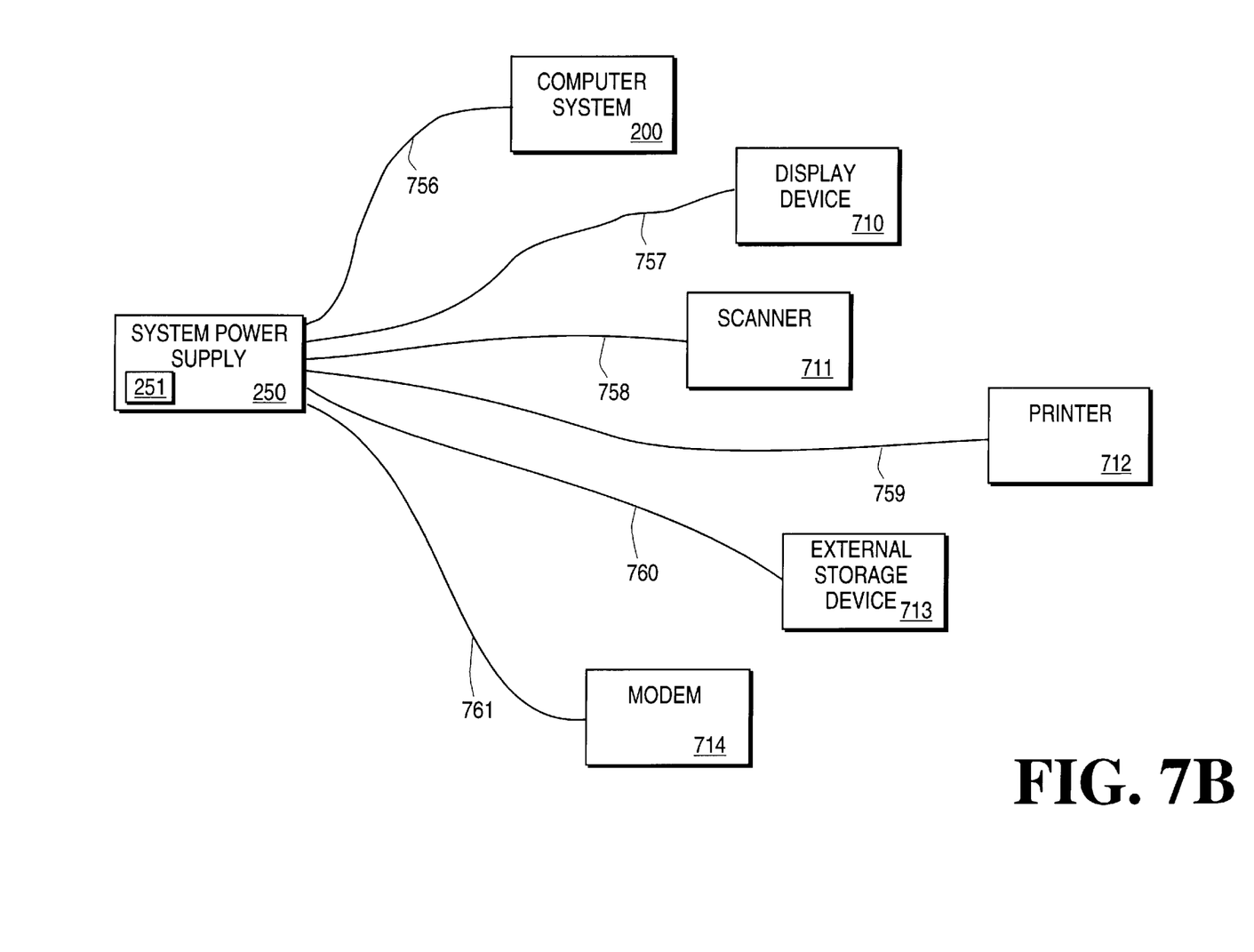
FIG. 7b is a block diagram illustrating devices external to the chassis of a computer system connected together in a hub topology and powered by the high frequency alternating current power distribution system according to an embodiment of the present invention.

It should be appreciated that the high frequency AC power distribution system of the present invention may also be used to supply power to devices connected externally to chassis of the computer system 200 (shown in FIG. 2) such as printers, scanners, external storage devices, modems, integrated services digital network (ISDN) devices, cameras, and other devices. According to an embodiment of the present invention, the system power supply 250 may reside external to the chassis of the computer system 200. The system power supply 250 may supply power to the computer system 200 and the devices connected externally to the chassis of the computer system 200 via a single cable configured in a daisy chain as illustrated in FIG. 7a. In this embodiment, an AC bus (not shown) may reside inside the system power supply 250 and a single signal bus 755, such as a Universal Serial Bus, may be coupled to the AC bus and used to deliver power to the computer system 200, display device 710, scanner 711, printer 712, external storage device 713, and modem 714. Alternatively, the system power supply 250 may supply power to the computer system 200 and the devices connected externally to the chassis of the computer system 200 via a hub configuration as illustrated in FIG. 7b. In this embodiment, a plurality of signal buses 756–761, such as Universal Serial Buses, may be coupled to the AC bus and used to deliver power to the computer system 200, display device 710, scanner 711, printer 712, external storage device 713, and modem 714. Each of the devices connected externally to the chassis of the computer system 200 includes a high frequency AC voltage regulator module such as the one described in FIG. 5.

By utilizing the high frequency AC power distribution system of the present invention to distribute power to devices connected externally to the chassis of the computer system 200, the devices are no longer required to have their own independent power supply. Thus, cost and physical space requirements for these devices are reduced.

Figure 8:
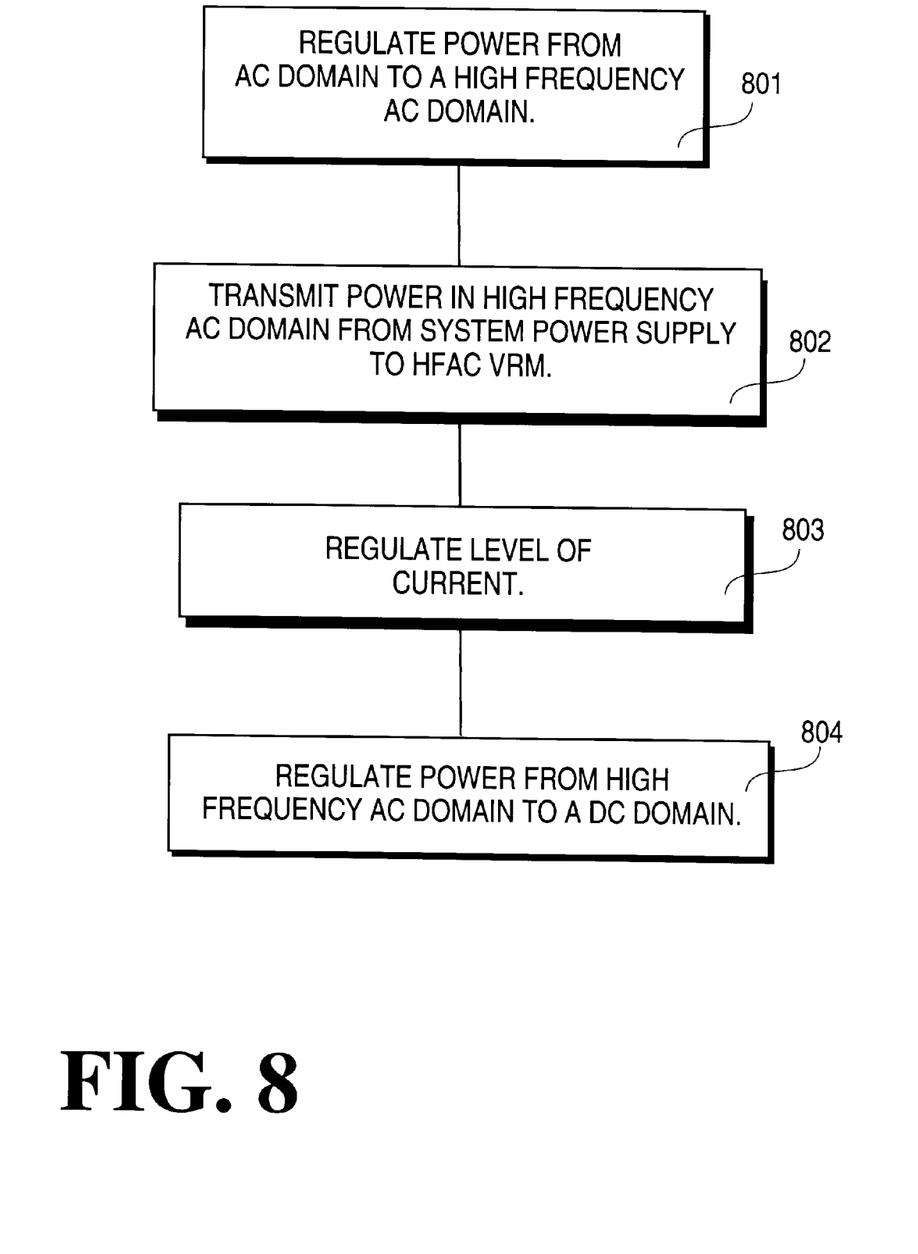
FIG. 8 is a flow chart illustrating a method for distributing power according to an embodiment of the present invention.

FIG. 8 is a flow chart illustrating a method for distributing power according to an embodiment of the present invention. At step 801, power in an AC domain is regulated to a high frequency AC domain. According to an embodiment of the present invention, the power in the AC domain is regulated to the high frequency AC domain by rectifying the power from the AC domain to a DC domain and converting the power from the DC domain to the high frequency AC domain.

At step 802, the high frequency AC power is transmitted from a system power supply to a high frequency AC voltage regulator module.

At step 803, a level of current received from the system power supply is regulated. According to an embodiment of the present invention, the level of current is regulated by a protection circuit in the high frequency AC voltage regulator module.

At step 804, the power is regulated from the high frequency AC domain to a DC domain. According to an embodiment of the present invention, the power is regulated from the high frequency AC domain to the DC domain by stepping down the power and rectifying the power from the high frequency AC domain to the DC domain. According to an embodiment of the present invention, the power is regulated from the high frequency AC domain to the DC domain by a post-regulator unit in the high frequency AC voltage regulator module.

In the foregoing description, the invention is described with reference to specific exemplary embodiments thereof. It will, however, be evident that various modifications and changes may be made thereto without departing from the broader spirit and scope of the present invention as set forth in the appended claims. The specification and drawings are accordingly to be regarded in an illustrative rather than in a restrictive sense.

What is claimed is:

1. A high frequency alternating current (AC) power distribution system, comprising:
    a transmission medium;
    a system power supply coupled to the transmission medium via a first contactless connector said first contactless connector comprising a first core with an electrical winding thereon, and a second core with an electrical winding thereon said second core removably coupled with the first core; and
    a high frequency AC voltage regulator module (VRM) coupled to the transmission medium via a second contactless connector, said second contactless connector comprising a first core with an electrical winding thereon, and a second core with an electrical winding thereon, said second core removably coupled with the first core, said VRM to receive power from the system power supply through the transmission medium.

2. The high frequency AC power distribution system of claim 1, wherein the transmission medium comprises a data bus.

3. The high frequency AC power distribution system of claim 1, wherein the system power supply comprises an inverter that transmits power in a high frequency AC domain on the transmission medium.

4. The high frequency AC power distribution system of claim 3, wherein the inverter comprises:

a rectifier unit that converts the power from an AC domain to a direct current (DC) domain:

a switching unit coupled to the rectifier, that converts the power from a DC domain to a high frequency AC domain; and a resonant circuit, coupled to the switching unit, that smooths an output of the power in the high frequency AC domain.

5. The high frequency AC power distribution system of claim 1, wherein the high frequency AC VRM comprises a post-regulator unit that regulates power in a high frequency AC domain from the transmission medium to a component on a computer system.

6. The high frequency AC power distribution system of claim 5, wherein the post-regulator unit comprises:

a rectifier unit that converts the power from the high frequency AC domain to a direct current (DC) domain; and a filtering unit, coupled to the rectifier unit, that filters out noise from an output of the power from the DC domain.

7. A high frequency alternating current (AC) voltage regulator module (VRM), comprising:

a first contactless connector coupled to a transmission medium, said first contactless connector comprising a first core with an electrical winding thereon, and a second core with an electrical winding thereon said second core removably coupled with the first core; and a post-regulator unit coupled to the first contactless connector, to regulate power in a high frequency AC domain from the transmission medium to a component on a computer system, the power received from a system power supply coupled to the transmission medium via a second contactless connector said second contactless connector comprising a first core with an electrical winding thereon, and a second core with an electrical winding thereon, said second core removably coupled with the first core.

8. The high frequency AC VRM of claim 7, wherein the contactless connector comprises a transformer with a primary core coupled to the transmission medium and a secondary core coupled to the post-regulator unit.

9. The high frequency AC VRM of claim 7, wherein the post-regulator unit comprises:

a rectifier unit that converts the power from the high frequency AC domain to a direct current (DC) domain; and a filtering unit, coupled to the rectifier unit, that filters out noise from an output of the power from the DC domain.

10. A system power supply, comprising:

an inverter to regulate power into a high frequency alternating current (AC) domain to transmit the power in the high frequency AC domain on a transmission medium to a high frequency AC voltage regulator module (VRM) coupled to the transmission medium via a first contactless connector said first contactless connector comprising a first core with an electrical winding thereon, and a second core with an electrical winding thereon said second core removably coupled with the first core; and a second contactless connector to couple the inverter to the transmission medium, said second contactless connector comprising a first core with an electrical winding thereon, and a second core with an electrical winding thereon said second core removably coupled with the first core.

11. The system power supply of claim 10, wherein the inverter comprises:

a rectifier unit to convert the power from an AC domain to a direct current (DC) domain;

a switching unit, coupled to the rectifier, to convert the power from a DC domain to a high frequency AC domain; and a resonant circuit, coupled to the switching unit, to smooth an output of the power in the high frequency AC domain.

12. A computer system, comprising:

a processor;

a transmission medium;

a system power supply coupled to the transmission medium via a first contactless connector, said first contactless connector comprising a first core with an electrical winding thereon, and a second core with an electrical winding thereon said second core removably coupled with the first core; and a high frequency AC voltage regulator module (VRM), coupled to the transmission medium via a second contactless connector said second contactless connector comprising a first core with an electrical winding thereon, and a second core with an electrical winding thereon, said second core removably coupled with the first core, to regulate power from the transmission medium to the processor.

13. The computer system of claim 12, wherein the contactless connector comprises a transformer with a primary core coupled to the system power supply and a secondary core coupled to the transmission medium.

14. An electronic system, comprising:

an electronic service;

a transmission medium;

a system power supply coupled to the transmission medium via a first contactless connector, said first contactless connector comprising a first core with an electrical winding thereon, and a second core with an electrical winding thereon, said second core removably coupled with the first core; and a high frequency AC voltage regulator module (VRM), coupled to the transmission medium via a second contactless connector, said second contactless connector comprising a first core with an electrical winding thereon, and a second core with an electrical winding thereon, said second core removably coupled with the first core to regulate power from the transmission medium to a processor.

* * * * *